Figures 1, 2A, 2B:
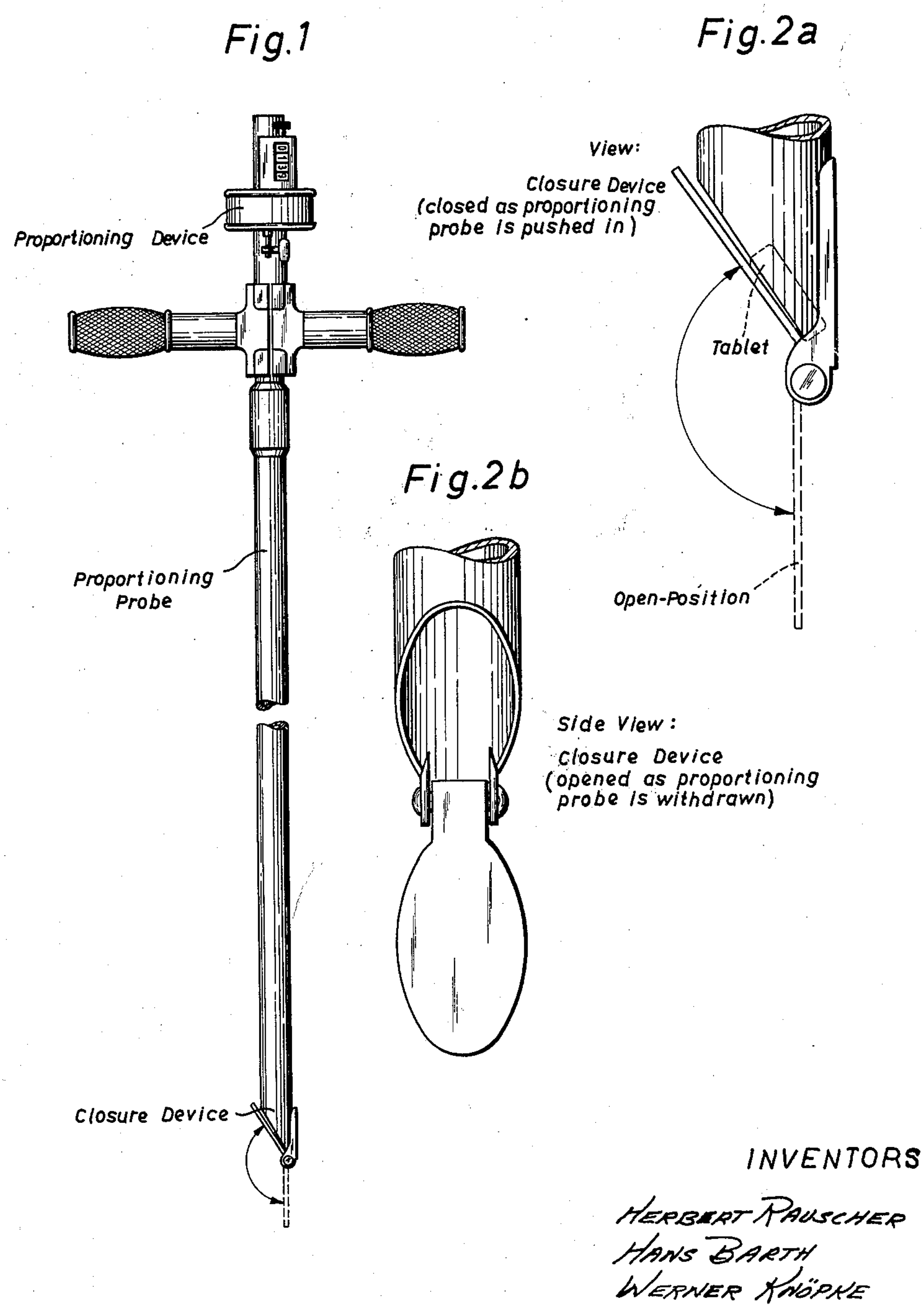
Figure 3:
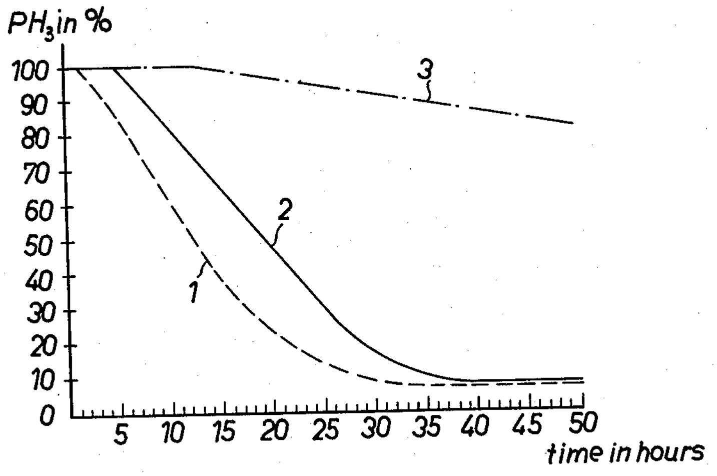

INVENTORS:
HERBERT RAUSCHER
HANS BARTH
WERNER KNÖPKE
By Bailey, Stephens & Huettig
ATTORNEYS INVENTORS:
HERBERT RAUSCHER
HANS BARTH
WERNER KNÖPKE
By Bailey, Stephens & Huettig
ATTORNEYS United States Patent Office 3,132,067

Patented May 5, 1964

1

3,132,067 METAL PHOSPHIDE COMPOSITIONS AND A PROCESS FOR THEIR PRODUCTION

Herbert Rauscher, Heddernheim, Im Uhrig 54, Frankfurt am Main, Hans Barth, Weismuller Strasse 38, Frankfurt am Main, and Werner Knöpke, Emanuel Kant Strasse 11, Sprendlingen, Germany Filed Aug. 15, 1960, Ser. No. 49,708
Claims priority, application Germany Mar. 31, 1960
10 Claims. (Cl. 167—14)

This invention relates to metal phosphides which are protected against moisture and to a process for the production and use thereof.

Certain phosphides which are used for pest control, for example phosphides of the alkaline earth metals, such as magnesium phosphide ($Mg_3P_2$) and also phosphides of the earth metals, such as aluminium phosphide ($AlP$) have the property of more or less quickly forming hydrogen phosphide by reaction with water or moisture. Desirable though the formation of hydrogen phosphide is at the site itself, it is very undesirable during manufacture, packing, storing, transport and during preparation, as well as during the actual use thereof.

Great efforts have been made to reduce the undesired formation of hydrogen phosphide; for example, metal phosphide has been placed in packs which were intended to impede the free access of water, or it has been supplied in the form of moulded elements having a minimum surface area in order to minimise the action by water. Additives designed to slow down the hydrolysis are also known, for example water-soluble salts. Furthermore, paraffins in dissolved or liquid form have for example already been proposed.

All the aforesaid proposals and processes were however only effective to an insufficient degree, namely, the prevention of the splitting off of hydrogen phosphide was too short or incomplete, or too long for pest control purposes.

It has now been found that substances which are particularly suitable for preventing uncontrollable hydrolysis of the phosphide as a function of time and quantity are those which, in the form of a layer over the individual phosphide particles, repel water in liquid form, but allow passage of water vapour after a more or less long time.

It has been found that these contradictory conditions are fulfilled in a particularly satisfactory manner by substances which do not react with the phosphide but form a continuous but very thin and not too hard film over the particles which film has sufficient mechanical and chemical resistivity.

It has furthermore been found that such a coating of organic substances, for example hard paraffin, which is applied in a suitable form, as hereinafter further described, to the phosphide particles becomes pervious to water vapour, while retaining its water-repelling property, if capillary apertures are formed therein.

This is achieved in a reliable manner if a blowing substance which will burst the coating under certain conditions is admixed with such protected phosphide.

It has now been found that this blowing or bursting substance can quite generally be a substance which can conveniently be chemically or physically modified and/or decomposed.

Accordingly the present invention provides a metal phosphide composition protected against moisture for pest-control purposes, wherein the individual particles or small particle groups of the phosphide are coated with a water-repelling, solid substance, and this substance has added thereto a substance which is capable of controllable physical and/or chemical modification and/or decomposition under predeterminable conditions, the modification and/or decomposition of which results indirectly or 2 directly in the production of capillary apertures in the coating which apertures permit the access of water vapour to the phosphide particles.

Substances which can be used for coating the particles are, for example organic substances such as natural resin, synthetic resin, rubber, stearin, paraffin, hard wax and others, but especially suitable is hard paraffin (paraffinum durum according to the Deutsches Arzneibuch, DAB VI, 3rd supplement, 1959).

The blowing or bursting substance which can be modified and/or decomposed and has the afore-mentioned properties can for example be a substance such as ammonium carbonate, ammonium bicarbonate, ammonium cyanide, but preferably ammonium carbamate; mixtures of any of these compounds may also be used. Such a substance is also preferably characterised by the fact that with its residue-free conversion and/or decomposition, it forms in known manner gaseous substances such as carbon dioxide and/or ammonia, which prevent or lower the possibility or spontaneous igniting of the hydrogen phosphide being formed. Thus, the ammonium carbamate proposed according to the invention decomposes under the influence of heat in a short time almost completely and directly from the solid to the gaseous condition.

Examples of phosphides which can be used for pest-control purposes, are the alkaline earth metal phosphides, such as magnesium phosphide or calcium phosphide, or the earth metal phosphides, such as aluminium phosphide, or mixtures of these said phosphides with one another, which give off their hydrogen phosphide under the influence of hydrolysis.

The fineness of the metal phosphide particles used depends on the required subsequent degree of reaction. The particle size can be in the order of magnitude of a few thousandths of a millimetre, but it should preferably be smaller than 5 microns.

The reaction mechanism of the blowing or bursting substance is clearly apparent from corresponding gas-discharge curves of suitable shaped elements of the material according to the invention, which are illustrated in the accompanying drawing in graph form.

This illustration shows the quantity of the hydrogen phosphide generated from the phosphide as a function of time during the gas extraction, curve 1 showing the development of hydrogen phosphide when using standard tablets, curve 2 showing the development of hydrogen phosphide when using tablets according to the invention, and curve 3 showing the development of hydrogen phosphide when using tablets with 4% of hard paraffin, but without a blowing or bursting substance.

Whereas with tablets manufactured according to prior processes, for example with admixture of an additive which merely inhibits ignition, the decomposition due to hydrolysis under the influence of atmospheric moisture and heat starts about one hour after extraction from the package, a phosphide tablet according to the invention remains quite unchanged externally even several hours after having been extracted from the package.

It has furthermore been found that particularly favourable conditions are produced with a metal phosphide composition consisting of 1 to 5% hard paraffin,
10 to 30% ammonium carbamate,
The remainder being aluminium phosphide.

One preferred composition within these ranges is as follows:

4% hard paraffin,
26% ammonium, carbamate, and
70% aluminium phosphide.

One preferred method of producing the pest-control agent comprises mixing 90 to 99% by weight of phosphide, preferably in powder form, with 10 to 1% by weight of the organic coating substance, for example hard paraffin, and also mixing therewith 10 to 50% by weight, calculated on the final product, of the substance, for example ammonium carbamate, which is modified and/or decomposed.

One process according to the invention which leads to particularly high-grade products is essentially characterised by the fact that metal phosphide prepared for example thermally is combined and intimately mixed during the cooling and at a temperature of for example 100 to 300° C. with the organic substance, preferably hard paraffin in molten form. In this case, the hot phosphide instantaneously absorbs the hard paraffin, substantially in the manner of a dry sponge, and because of the large surface of the finely powdered phosphide, an extremely fine and uniform coating is formed on the individual particles.

Absolutely constant and uniform coatings are formed per particle in the mixed product consisting of phosphide and paraffin, so that a constant composition of the mixed product and also of the subsequent final product is guaranteed.

The mixed product is now ground to the desired degree of fineness and the blowing or bursting substance, for example ammonium carbamate, is added thereto in a suitably fine form, and shaped elements of any desired form, for example tablets, are pressed from this mixture, which tablets are either stored at room temperature for a relatively long period or are briefly heated under pressure and temperature conditions which do not actuate the blowing or bursting substance. In this way, any phosphide surfaces which may have been exposed during the grinding or crushing are again covered by hard paraffin, as are also all or part of the carbamate particles.

The relatively long storage at room temperature surprisingly produces practically the same effects on the complete coating as does the brief heating, which suggests that during the storage there is some creep of the coating medium. The paraffin covers all particles with a very fine layer which repels water in liquid form but permits water in vapour form to reach the phosphide particles when, as a result of the action of the blowing or bursting substance, capillary apertures are formed in the coating.

An additional very advantageous embodiment of the process of the invention consists in mixing fine metal phosphide in the cold state with finely divided, for example ground, hard paraffin adding to this mixture the blowing substance, preferably ammonium carbamate, also in finely divided form, for example as a powder, and moulding the mixed product into the form ready for use, for example into tablets. Metal phosphide particles, paraffin particles and blowing substance particles, preferably ammonium carbamate particles, can also be simultaneously mixed in the cold and finely divided form and thereafter be pressed into shaped elements, for example tablets.

These shaped elements are now heated for a short period under conditions of pressure and temperature which do not actuate the blowing or bursting substance. The hard paraffin melts and in this case forms an extremely fine layer over all the particles of the shaped element, either as individual particles or in small groups, so that in addition to an excellent bonding of the particles or groups of particles with one another at a pre-determined temperature, there is also achieved and guaranteed the desired protection against the action of water in liquid form, whereas, after the action of the blowing or bursting substance, water vapour is able to penetrate the capillaries formed and results in a more accurately controllable gas discharge.

The metal phosphide according to the invention can thus be processed in a particularly satisfactory manner into shaped elements, because a separate pressing agent is not necessary, since the hard paraffin acts as such and increases the pressing capacity of the phosphide in a very desirable manner. In addition, there is no longer any danger during the processing that the product loses its content of hydrogen phosphide due to hydrolysis starting prematurely. As a result, the hitherto unavoidable disadvantage of premature action at the site is substantially reduced.

A further advantage is that the finely powdered metal phosphide treated according to the invention no longer forms a dust. Tablets made of this new phosphide can even be held in the hand without any danger of crumbling or forming dust. The resistance to abrasion is high, so that no danger due to dust formation likewise does not arise, either on handling or during storage, transport or use.

The resistance to temperature of the product according to the invention is also considerably better than the prior known forms. The improvement extends not only to temporary heating, but also to heating over a longer period, in a tight pack at relatively high storage temperatures and thus contributes to improving the keeping properties of the shaped elements.

The metal phosphide protected against moisture in accordance with the present invention is used, preferably in tablet form, for combatting animal pests, more especially rodents and insects, in the disinfestation of warehouses, and silos, and also for so-called soil sterilisation.

One particularly advantageous method of use of the product of the invention consists in introducing the product according to the invention, preferably in tablet form, into the medium to be treated, for example grain, soil or the like, by means of a tube comprising a proportioning device at the supply end and a closure device at the discharge end. The closure device of a tube serving as a proportioning probe is preferably so designed to be automatic so that it is automatically closed when the tube is inserted into the medium to be treated, for example the grain, soil and the like, and is opened automatically on withdrawing the tube and thereby causes the discharge of the tablet, see FIGS. 1 and 2*a* and *b* in the accompanying drawing.

We claim:

1. A tablet for pest control purposes comprising a compressed intimate mixture of a finely divided metal phosphide capable of being decomposed by moisture to form phosphine and a finely divided decomposable ammonium compound selected from the group consisting of ammonium carbonate, ammonium bicarbonate, ammonium cyanide and ammonium carbamate, and a water repelling solid substance selected from the group consisting of natural and synthetic resins, rubber, stearin and hard waxes, said water repelling solid substance being uniformly distributed in such tablet in the form of a thin protective coating over the phosphide and ammonium compound particles.

2. A metal phosphide composition according to claim 1, wherein the particles of the metal phosphide are of a size below 5 microns.

3. A tablet for pest control purposes comprising a compressed intimate mixture of about 1 to 5% by weight of hard paraffin, about 10–30% of finely divided ammonium carbamate and the remainder aluminum phosphide, said paraffin being uniformly distributed in such tablet in the form of a thin protective coating over the aluminum phosphide and ammonium carbamate particles.

4. A tablet for pest control purposes comprising a compressed intimate mixture of about 4% by weight of hard paraffin, about 26% of finely divided ammonium carbamate and about 76% aluminum phosphide, said paraffin being uniformly distributed in such tablet in the form of a thin protective coating over the aluminum phosphide and ammonium carbamate particles.

5. A tablet for pest control purposes comprising a compressed intimate mixture of a finely divided metal phosphide capable of being decomposed by moisture to form phosphine and a finely divided decomposable ammonium compound selected from the group consisting of ammonium carbonate, ammonium bicarbonate, ammonium cyanide and ammonium carbamate, and a water repelling solid waxy substance, said water repelling solid substance being uniformly distributed in such tablet in the form of a thin protective coating over the phosphide and ammonium compound particles, the proportion of said waxy substance being about 1 to 10% by weight with reference to said phosphide and the proportion of said ammonium compound being about 10 to 50% by weight with reference to the total composition.

6. A method for the production of a tabletted composition according to claim 5 which comprises intimately mixing 90 to 99 parts by weight of the finely divided metal phosphide with 10 to 1 parts by weight of hard paraffin and with 10% to 50% by weight of the ammonium compound with reference to the total mixture and compressing said intimate mixture into tablets.

7. A method for the production of a tabletted composition according to claim 5 which comprises intimately mixing 90 to 99 parts by weight of the finely divided metal phosphide with 10 to 1 parts by weight of hard paraffin and with 10% to 50% by weight of the ammonium compound with reference to the total mixture and compressing said intimate mixture into tablets and heating such tablets briefly to melt the paraffin under temperature and pressure conditions preventing substantial decomposition of the ammonium compound.

8. A method for the production of a tabletted composition according to claim 5 which comprises intimately mixing 10 to 1 parts by weight of hard paraffin with 90 to 99 parts by weight of the metal phosphide at a temperature of about 100 to 300° C. to coat the phosphide with such paraffin, grinding the coated phosphide to the desired degree of fineness, intimately admixing 10 to 50% by weight with reference to the total mixture of the finely divided ammonium compound therewith, compressing said intimate mixture into tablets.

9. A method for the production of a tabletted composition according to claim 5 which comprises intimately mixing 10 to 1 parts by weight of hard paraffin with 90 to 99 parts by weight of the metal phosphide at a temperature of about 100 to 300° C. to coat the phosphide with such paraffin, grinding the coated phosphide to the desired degree of fineness, intimately admixing 10 to 50% by weight with reference to the total mixture of the finely divided ammonium compound therewith, compressing said intimate mixture into tablets and heating such tablets briefly to melt the paraffin under temperature and pressure conditions preventing substantial decomposition of the ammonium compound.

10. A method of combatting animal pests which comprises introducing a tablet as claimed in claim 5 into the environment of such animal pests in contact with water vapor.

References Cited in the file of this patent

UNITED STATES PATENTS

| | | |
|---|---|---|
| Re. 24,090 | Diamond | Nov. 15, 1955 |
| 1,646,767 | Schille | Oct. 25, 1927 |
| 1,727,457 | Van Meter | Sept. 10, 1929 |
| 2,390,686 | Bishop | Dec. 11, 1945 |
| 2,413,143 | Jucksch | Dec. 24, 1946 |
| 2,699,418 | Horst | Jan. 11, 1955 |
| 2,793,979 | Svedres et al. | May 28, 1957 |
| 2,809,916 | Hermelin | Oct. 15, 1957 |
| 2,826,527 | Huter | Mar. 11, 1958 |
| 2,987,445 | Levesque | June 6, 1961 |

FOREIGN PATENTS

| | | |
|---|---|---|
| 213,422 | Australia | May 17, 1956 |